United States Patent [19]

Kaplan

[11] Patent Number: 4,746,459

[45] Date of Patent: * May 24, 1988

[54] SELF-DISPERSING TIN OXIDE SOLS

[75] Inventor: Morris Kaplan, Houston, Tex.

[73] Assignee: Nalco Chemical Company, Oak Brook, Ill.

[*] Notice: The portion of the term of this patent subsequent to Sep. 16, 2003 has been disclaimed.

[21] Appl. No.: 4,761

[22] Filed: Jan. 9, 1987

Related U.S. Application Data

[63] Continuation of Ser. No. 639,637, Aug. 10, 1984, abandoned, which is a continuation-in-part of Ser. No. 510,806, Jul. 5, 1983, Pat. No. 4,488,984.

[51] Int. Cl.$^4$ .............................................. B01J 13/00
[52] U.S. Cl. ........................... 252/313.1; 208/52 CT; 208/78; 208/113; 208/114; 208/120; 252/309; 502/25; 502/26; 502/31; 502/173; 502/521
[58] Field of Search ................... 252/313.1, 309, 610; 208/52 CT, 78, 113, 114, 120; 502/25, 26, 31, 173, 521

[56] References Cited

U.S. PATENT DOCUMENTS

| | | | |
|---|---|---|---|
| 3,346,468 | 10/1967 | Jongkled | 204/54 |
| 3,455,794 | 7/1969 | Passal et al. | 204/54 |
| 3,462,373 | 8/1969 | Jongkled | 252/313.1 |
| 3,676,362 | 7/1972 | Yates | 252/309 |
| 3,711,422 | 1/1973 | Johnson et al. | 502/31 |
| 3,723,273 | 3/1973 | Wilson | 204/180 P |
| 3,860,523 | 1/1975 | Petrow et al. | 252/610 |
| 4,026,819 | 5/1977 | Langere et al. | 252/313.1 |
| 4,040,945 | 8/1977 | McKinney et al. | 208/113 |
| 4,101,417 | 7/1978 | Mitchell et al. | 208/120 |
| 4,147,605 | 4/1979 | Schenker et al. | 204/180 P |
| 4,203,822 | 5/1980 | Schenker et al. | 204/180 P |
| 4,321,129 | 3/1982 | Bertus et al. | 208/120 |
| 4,326,990 | 4/1982 | Mark et al. | 502/25 |
| 4,483,765 | 11/1984 | Payne | 252/313.1 X |
| 4,488,984 | 12/1984 | Kaplan | 252/313.1 |
| 4,612,138 | 9/1986 | Keiser | 252/313.2 |

*Primary Examiner*—Richard D. Lovering
*Attorney, Agent, or Firm*—John G. Premo; Anthony L. Cupoli; Donald G. Epple

[57] ABSTRACT

An aqueous sol composition from the group consisting of antimony and tin sols useful in restoring the activity of metal contaminated molecular sieve cracking catalysts which comprises a major portion of an aqueous antimony sol or tin sol containing between 1-50% by weight of antimony oxide as $Sb_2O_5$ or tin oxide as $SnO_2$ and between 0.1-20% by weight of a compatable water-soluble surfactant which is capable of producing a water-in-oil emulsion and having an HLB of at least 6.0.

2 Claims, No Drawings

SELF-DISPERSING TIN OXIDE SOLS

INTRODUCTION

This application is a continuation of U.S. application Ser. No. 639,637, filed Aug. 10, 1984 and now abandoned, which is a continuation-in-part of Ser. No. 510,806, filed July 5, 1983, which has issued as U.S. Pat. No. 4,488,984.

It is now known that molecular sieve cracking catalysts which have been contaminated with such metals as vanadium and nickel can be restored by contacting these contaminated catalysts with antimony or mixed antimony-tin containing compounds and then subsequently subjecting the thus-treated catalysts to elevated temperatures and an oxygen-containing gas whereby revitalization is achieved.

This technology is described in U.S. Pat. Nos. 3,711,422, 4,321,129 and 4,326,990 and disclosure of which are incorporated herein by reference.

In commercial practice, the antimony compound is usually in the form of an organo metallic antimony compound which is oil-soluble. These compounds are then fed as a side stream to the liquid hydrocarbon feed going to the cracking catalyst. Under the conditions of regeneration, the organo metallic antimony compound decomposes to antimony oxide.

In an effort to reduce the costs of this rejuvenation process, attempts have been made to use antimony oxide powders or antimony oxide aqueous sols to provide a cheap source of antimony for treating the contaminated catalysts. These efforts have not been too successful since these hydrophilic forms of antimony are incompatible with the liquid hydrocarbon streams and, therefore, when used, do not provide a uniform treatment of the contaminated catalysts.

Tin-containing compounds have been claimed to be effective as vanadium passivators in FCC Units. The tin compound is fed to the unit in the form of a hydrocarbon soluble organo metallic tin compound. This technology is described in U.S. Pat. Nos. 4,101,417 and 4,404,945. The use of aqueous tin oxide sols would provide a more cost effective product, but these aqueous forms of tin are incompatible with liquid hydrocarbon streams.

THE INVENTION

The invention comprises a self-dispersing aqueous antimony sol and/or a tin sol which contains between about 1-50% of antimony oxide expressed as $Sb_2O_5$ and between about 1-50% of tin oxide expressed as $SnO_2$. These sols contain 0.1-20% by weight of a water-soluble emulsifier capable of forming a water-in-oil emulsion. In a preferred embodiment, the amount of emulsifier is within the range of 0.5-5% by weight.

The antimony and/or tin sol composition of the invention, when added to a catalytic cracking unit slip stream, forms a uniformly distributed antimony or tin oxide throughout the slip stream. The same sol without the emulsifier form a course dispersion that is not distributed throughout.

THE ANTIMONY SOLS

These materials are well known and may be prepared using a number of well known techniques. One method for preparing an antimony trioxide sol is described in U.S. Pat. No. 3,676,362 in which an antimony trichloride is dissolved in an organic solution, treated with $NH_4OH$ to produce $NH_4Cl$ and antimony trioxide. The $NH_4Cl$ is removed and the antimony trioxide is present as a sol in the solution.

Another prior art method of preparing the antimony pentoxide sol is described in U.S. Pat. No. 3,860,523. In this procedure a solution of potassium antimonate (containing 2% by weight of antimony calculated as $Sb_2O_5$) is passed through a hydrogen form cation exchange resin whereby the potassium ions are exchanged for hydrogen ions to yield a pentavalent antimony oxide sol. The low concentration of antimony pentoxide obtained by this process requires an evaporation step to obtain a high concentration of antimony.

Other prior art methods are described which show that antimony pentoxide may be formed from antimony trioxide by treating the antimony trioxide with HCl to form antimony trichloride which, in turn, is oxidized to antimony pentoxide by reacting the antimony trichloride with hydrogen peroxide to form hydrates of antimony pentoxide.

THE TIN SOLS $SnO_2$ sols have been prepared by electrodialysis (U.S. Pat. Nos. 3,723,273; 4,147,605; 4,203,822), by treating alkali metal stannate with ion exchange resins (U.S. Pat. Nos. 3,455,794; 3,888,788), and by reacting an alkali metal stannate with an acid to precipitate hydrated stannic oxide, washing to remove electrolytes, and peptizing the hydrated stannic oxide floc with potassium hydroxide or potassium stannate (U.S. Pat. Nos. 3,346,468; 3,462,373). Another method is preparing hydrated stannic oxide floc from stannic chloride, removing electrolytes by dia-filtration and peptizing the floc with diethylaminoethanol.

THE WATER-SOLUBLE, WATER-IN-OIL EMULSIFYING AGENTS

These materials may be generically described as emulsifying agents, dispersants, or wetting agents. The HLB of the emulsifier is at least 6 and preferably within the range of 8-18. Many emulsifying agents falling within this HLB range are not water-soluble and, hence, may not be used. Routine experiments can determine the type and amount of emulsifier that may be used. These emulsifiers are further characterized in that they must not destabilize the sols under conditions of long-term storage. As indicated, a preferred emulsifying agent is dodecyl benzene sulfonic acid neutralized in the sol with morpholine or other amine.

A typical composition of the invention is a 10-30% antimony or tin oxide sol which contains 1-4% by weight of the amine salt of dodecyl benzene sulfonic acid. The amount of amine in the salt makes the pH of the sols about 8-11.

This material, when added to a typical catalytic cracking unit feed stock such as light cycle oil, forms a meta-stable water-in-oil emulsion which uniformly distributes the antimony and/or tin oxide therethroughout. The same sol without the emulsion forms as course dispersion that is not distributed throughout the light cycle oil.

The products of the invention can be added into any hydrocarbon liquid prior to being injected into a hydrocarbon stream going to a fluid catalytic cracking unit. The hydrocarbons can be a hydrocarbon liquid from a side stream coming from the fluid catalytic cracking unit or other hydrocarbon liquids illustrated by, but not limited to, feed oils, gas oils, gasoline, diesel fuel oils, kerosenes or bottom recycle oils. The specific addition points, in addition to a side cut slip stream going to a fluid catalytic cracking unit, would be blend tanks on the fluid catalytic cracking unit. Other central pumping points in the refinery going to the fluid catalytic cracking units can serve as an addition point for adding the antimony and/or tin sol emulsions.

When emulsions of the type described above are added in the manner prescribed, the antimony or tin particles contained in the sol are uniformly dispersed into the hydrocarbon liquid. It is believed that when the starting materials of this invention are added to large volumes of hydrocarbon liquids, that in all probability the antimony and/or tin sols become dispersed in the feed stream, most probably in the form of a water-in-oil emulsion.

To illustrate the preparation of $SnO_2$ sols, the following is presented:

The method of making the tin composition of this invention involves preparing hydrated stannic oxide from potassium stannate and separating the hydrated stannic oxide floc from the supernatant aqueous medium by decantation. The floc may be washed by mixing with water and the decantation process repeated several times. The floc is finally freed from electrolytes by diafiltration and peptized using monoethanolamine. Other organic amines which are water-soluble and have similar basicity can be used as peptizing agents. Potassium hydroxide or potassium stannate cannot be used as peptizing agents because potassium acts as a cracking catalyst poison. The method of making the tin composition of this invention is as described in U.S. Pat. Nos. 3,346,468; 3,462,373 except for the use of diafiltration and the use of monoethanolamine as peptizing agent.

Having thus described my invention, I claim:

1. An aqueous sol composition consisting of tin sols useful in restoring the activity of metal contaminated molecular sieve cracking catalysts which comprises a major portion of an aqueous tin sol containing between 1–50% by weight of tin oxide as $SnO_2$ and between 0.1–20% by weight of a compatible water-soluble surfactant which is capable of producing a water-in-oil emulsion and having an HLB of at least 6.0.

2. The composition of claim 1 where the water-soluble surfactant is dodecyl benzene sulfonate neutralized with morpholine.

* * * * *